(12) United States Patent
Matsushita et al.

(10) Patent No.: US 8,009,380 B2
(45) Date of Patent: Aug. 30, 2011

(54) DISK DRIVE AND METHOD FOR CONTROLLING CLEARANCE IN THE DISK DRIVE

(75) Inventors: Shinji Matsushita, Kanagawa (JP); Kenichi Kuramoto, Kanagawa (JP); Kenji Kuroki, Kanagawa (JP); Takahiro Nishioka, Kanagawa (JP); Masayuki Ishikawa, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 12/623,345

(22) Filed: Nov. 20, 2009

(65) Prior Publication Data
US 2010/0128383 A1 May 27, 2010

(30) Foreign Application Priority Data
Nov. 21, 2008 (JP) ................ 2008-2998845

(51) Int. Cl.
*G11B 21/02* (2006.01)
(52) U.S. Cl. ......................................................... 360/75
(58) Field of Classification Search ........................ None
See application file for complete search history.

(56) References Cited

U.S. PATENT DOCUMENTS

| | | | |
|---|---|---|---|
| 5,168,413 A | 12/1992 | Coker et al. | |
| 6,473,259 B1 | 10/2002 | Kuo et al. | |
| 6,972,919 B2 * | 12/2005 | Suk | 360/75 |
| 7,310,194 B1 | 12/2007 | Schardt et al. | |
| 7,457,072 B2 * | 11/2008 | Dieron et al. | 360/75 |
| 7,583,466 B2 * | 9/2009 | Kermiche et al. | 360/75 |
| 2002/0054447 A1 | 5/2002 | Kurita et al. | |
| 2008/0019032 A1 | 1/2008 | Hayakawa et al. | |
| 2008/0225430 A1 * | 9/2008 | Kawamoto et al. | 360/75 |

* cited by examiner

*Primary Examiner* — K. Wong (57) ABSTRACT

A disk drive. The disk drive includes a disk configured to store data, a slider configured to fly in proximity to the disk, and a magnetic-recording head on the slider configured to access the disk. The disk drive also includes a moving mechanism configured to support and to move the head-slider, an adjustment portion configured to adjust clearance between the magnetic-recording head and the disk, and a controller configured to control the adjustment portion to control the clearance. The controller is configured to perform clearance control in a first mode in an operation selected from the group consisting of reading user data and writing user data according to a change in fly height of the slider after a load operation, and subsequently is configured to perform clearance control in a second mode in an operation selected from the group consisting of reading user data and writing user data.

15 Claims, 10 Drawing Sheets

|    | t0  | t1  | t2  | ... | tk  | ... | tn  |
|----|-----|-----|-----|-----|-----|-----|-----|
| T0 | R00 | R01 | R02 | ... | R0k | ... | R0n |
| T1 | R10 | R11 | R12 | ... | R1k | ... | R1n |
| T2 | R20 | R21 | R22 | ... | R1k | ... | R1n |
| ⋮  | ⋮   | ⋮   | ⋮   | ... | ⋮   | ... | ⋮   |
| Tk | Rk0 | Rk1 | Rk2 | ... | Rkk | ... | Rkn |
| ⋮  | ⋮   | ⋮   | ⋮   | ... | ⋮   | ... | ⋮   |
| Tn | Rn0 | Rn1 | Rn2 | ... | Rnk | ... | Rnn |

FIG. 10

DISK DRIVE AND METHOD FOR CONTROLLING CLEARANCE IN THE DISK DRIVE

CROSS-REFERENCE TO RELATED APPLICATION

This application claims priority from the Japanese Patent Application No. 2008-2998845, filed Nov. 21, 2008, the disclosure of which is incorporated herein in its entirety by reference.

TECHNICAL FIELD

Embodiments of the present invention relate to a disk drive and a method for controlling clearance in the disk drive.

BACKGROUND

Disk drives using various kinds of disks, such as optical disks, magneto-optical disks, flexible magnetic-recording disks, and similar data-storage disks are known in the art. In particular, hard-disk drives (HDDs) have been widely used as indispensable data-storage devices for contemporary computer systems. Moreover, HDDs have found widespread application to motion picture recording and reproducing apparatuses, car navigation systems, cellular phones, and similar devices, in addition to the computers, due to their outstanding data-storage characteristics.

A magnetic-recording disk used in a HDD includes multiple concentric data tracks and servo tracks. A servo track includes multiple servo sectors having address information. A data track includes multiple data sectors containing user data. A data sector is recorded between separate servo data regions in the circumferential direction. A read element, or alternatively, a write element, of a magnetic-recording head of a head-slider supported by a rotary actuator accesses designated data sectors according to address information in servo sectors to write data to, and read data from, data sectors.

In order to increase the recording density of a magnetic-recording disk, the clearance between the read element, or alternatively, the write element, of the magnetic-recording head of the head-slider, flying in proximity to the recording surface of the magnetic-recording disk, and the magnetic-recording disk is decreased; and, variations in the clearance are also decreased. To this end, some mechanisms have been proposed to control the clearance. One such mechanism, which is referred to herein by the term of art, "thermal fly-height control," or "TFC," includes a heater on a head-slider; the heater heats the read element, or alternatively, the write element, of the magnetic-recording head of the head-slider and the surroundings to adjust the clearance. TFC generates heat by applying electrical current to the heater to cause the read element, or alternatively, the write element, of the magnetic-recording head to protrude by thermal expansion. This decreases the clearance between the magnetic-recording disk and the magnetic-recording head. Other mechanisms are known in the art that use a piezoelectric element, or alternatively, coulomb force, to adjust the clearance between the magnetic-recording disk and the magnetic-recording head.

Engineers and scientists engaged in HDD manufacturing and development are interested in the design of HDDs that control the clearance and variations in the clearance between the magnetic-recording head of the head-slider and the magnetic-recording disk to meet the rising demands of the marketplace for increased data-storage capacity, performance, and reliability.

SUMMARY

Embodiments of the present invention include a disk drive. The disk drive includes a disk configured to store data, a slider configured to fly in proximity to a recording surface of the disk, and a magnetic-recording head on the slider configured to access the disk. The disk drive also includes a moving mechanism configured to support and to move the head-slider, an adjustment portion configured to adjust clearance between the magnetic-recording head and the disk, and a controller configured to control the adjustment portion to control the clearance. The controller is configured to perform clearance control in a first mode in an operation selected from the group consisting of reading user data and writing user data according to a change in fly height of the slider after a load operation, and subsequently is configured to perform clearance control in a second mode in an operation selected from the group consisting of reading user data and writing user data.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

DESCRIPTION OF EMBODIMENTS OF THE PRESENT INVENTION FOR A DISK DRIVE AND A METHOD FOR CONTROLLING CLEARANCE IN THE DISK DRIVE

With relevance to embodiments of the present invention, the clearance depends on the temperature in the disk drive, because the protrusion amount of a magnetic-recording head varies with the temperature in the disk drive, which for purposes of the following discussion may be a hard-disk drive (HDD), by way of example without limitation thereto. However, in accordance with embodiments of the present invention, the inventors have found that the clearance begins to change with the elapsed time immediately after the head-slider has moved in proximity to the recording surface of a magnetic-recording disk, which occurs upon a load operation. Specifically, the clearance reduces with time after the load operation and converges to a specific value. The temperature in the disk drive does not change substantially during the clearance change. Thus, the clearance change is due to factors different from the temperature.

In accordance with embodiments of the present invention, the inventors' have found that the clearance change is due to deposits on a head-slider body. The clearance changes because of the deposition of particles and lubricant from the magnetic-recording disk onto a head-slider body. Generally, if foreign matter such as particles and lubricant deposits on an air-bearing surface (ABS) of a head-slider facing a magnetic-recording disk, air pressure on the ABS increases and the slider body moves upward. As a result, the clearance between the magnetic-recording head and the magnetic-recording disk increases.

While a head-slider is flying in proximity to the recording surface of a magnetic-recording disk, however, deposits on the ABS gradually move to side surfaces of the head-slider body from the ABS and the deposits on the ABS decrease. With the end of the movement of the deposits from the ABS, the clearance reaches the specific value, and then, remains substantially constant.

Figure 10:
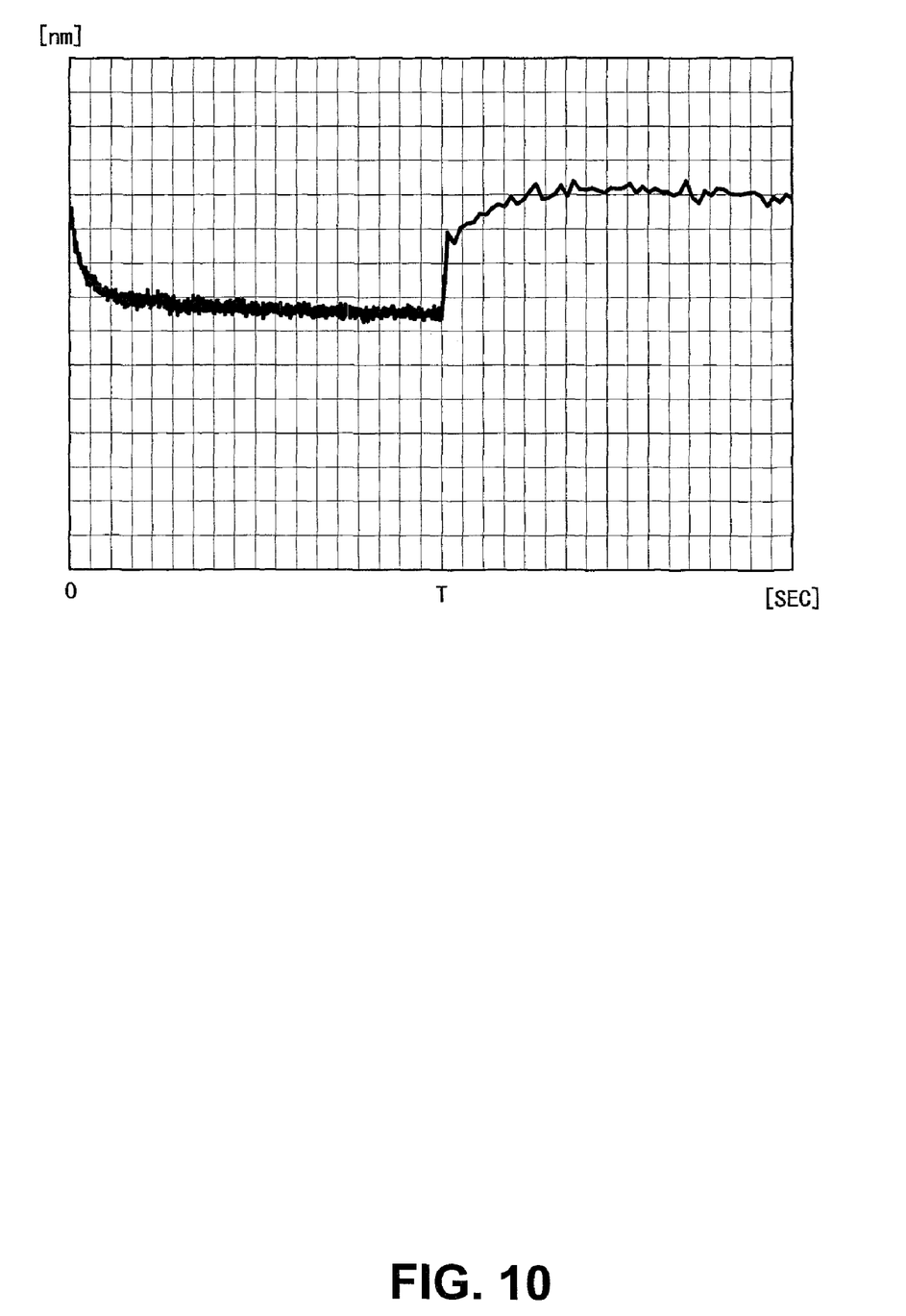
FIG. 10 is a graph of a measurement result showing the graphical relationship between an elapsed time after a head-slider has moved in proximity to the recording surface of a magnetic-recording disk from a ramp and a change in clearance between the magnetic-recording head and the magnetic-recording disk, with relevance to embodiments of the present invention.

With reference now to FIG. 10, with relevance to embodiments of the present invention, a graph of a measurement result is shown that shows the graphical relationship between the elapsed time after a head-slider has moved in proximity to the recording surface of a magnetic-recording disk from a ramp, which occurs upon a load operation, and a change in clearance between the magnetic-recording head of the head-slider and the magnetic-recording disk. As used herein, the clearance between the magnetic-recording head of the head-slider and the magnetic-recording disk may be referred to by the term of art, "fly height." The time unit of the X axis is given in seconds (sec); and, the Y axis represents the change in the clearance, which is the fly height, which is given in nanometers (nm).

From the 0 second point to the T second point, the head-slider is maintained flying in proximity to the recording surface of the magnetic-recording disk. The clearance starts decreasing abruptly immediately after the load operation, and then, converges on the specific value. The reduction rate of the clearance is large immediately after the load operation, and then, decreases gradually. The clearance change from the 0 second point to the T second point coincides with the above description with respect to the clearance change due to movement of the deposit on the head-slider flying in proximity to the recording surface of a magnetic-recording disk.

After the T second point, the head-slider repeated travel between the magnetic-recording disk and the ramp; and, the clearance change was measured every time the head-slider moved in proximity to the recording surface of the magnetic-recording disk. Specifically, the head-slider moved from proximity to the recording surface of the magnetic-recording disk to the ramp, which occurs upon an unload operation, remained above the ramp for a specified time, and was again moved into proximity with the recording surface of the magnetic-recording disk. The clearance was measured immediately after the load operation. The head-slider moved to above the ramp just after the clearance measurement. The same process was repeated.

The clearance measurement value increase gradually after the T second point, and then, remained at another specific value. This phenomenon is interpreted to mean: deposits on the side surfaces of the slider move to the ABS while the head-slider stays above the ramp; an increase in the amount of the deposit on the ABS leads to an increase in the clearance; and, if all the deposits move to the ABS, the clearance remains at a constant value.

In this way, the large clearance immediately after a load operation adversely affects reading and/or writing operations of user data. A HDD repeats load and unload operations after start-up in order to reduce power and increase reliability. If the clearance is large, write magnetic fields from a magnetic-recording head could be too small to write magnetic information correctly onto a magnetic-recording disk. Magnetic fields from a magnetic-recording disk could be too small to read magnetic data correctly, and as a result, the HDD could retry the magnetic data read operations, resulting in a performance deterioration. Therefore, embodiments of the present invention control the clearance in response to behavior of a head-slider after a load operation and the clearance change.

In accordance with embodiments of the present invention, a disk drive includes a disk configured to store data, a slider configured to fly in proximity to the recording surface of a disk, a magnetic-recording head on the slider configured to access the disk, a moving mechanism configured to support and to move the head-slider, an adjustment portion for adjusting clearance between the magnetic-recording head and the disk, and a controller configured to adjust the adjustment portion to control the clearance. In accordance with embodiments of the present invention, the controller is configured to perform clearance control in a first mode in an operation selected from the group consisting of reading user data and writing user data according to a change in fly height of the slider after a load operation, and is configured to perform subsequently clearance control in a second mode in an operation selected from the group consisting of reading user data and writing user data. Thus, in accordance with embodiments of the present invention, the controller allows appropriate clearance control according to a change in fly height due to deposits after a load operation.

In an embodiment of the present invention, the controller is configured to perform the clearance control in the first mode with reference to a first profile indicating the change in fly height with an elapsed time after the load operation. Thus, in an embodiment of the present invention, the controller reduces the process to control the clearance appropriately. In an embodiment of the present invention, the controller is configured to perform a clearance measurement after the load operation, and to perform the clearance control in the first mode in accordance with a measurement result of the clearance measurement and the first profile. In another embodiment of the present invention, the controller is configured to perform multiple clearance measurements after the load operation, and to perform the clearance control in the first mode in accordance with measurement results of the multiple clearance measurements and the first profile. Thus, in an embodiment of the present invention, the controller allows more precise clearance control. In another embodiment of the present invention, the controller is configured to refer to a different profile from the first profile depending on detected temperature. Thus, in an embodiment of the present invention, the controller allows appropriate clearance control according to temperature.

In another embodiment of the present invention, the controller is configured to perform multiple clearance measurements after the load operation and to perform the clearance control in the first mode in accordance with the measurement results of the multiple clearance measurements. Thus, in an embodiment of the present invention, this allows more precise clearance control. In another embodiment of the present invention, the controller is configured to perform a clearance measurement after the load operation, is configured to perform an operation selected from the group consisting of skipping the first mode and ending the first mode, and is configured to perform the clearance control the second mode in an operation selected from the group consisting of reading user data and writing user data if the measurement result is within a reference range. Thus, in an embodiment of the present invention, the controller allows appropriate clearance control according to the state of deposits.

Embodiments of the present invention include a method for controlling clearance between a magnetic-recording head on a slider and a disk in a disk drive. The method moves a head-slider from a waiting position into proximity with a recording surface of a disk in a load operation. The method performs clearance control in a first mode in an operation selected from the group consisting of reading user data and writing user data according to a change in fly height of the slider after the load operation. The method performs clearance control in a second mode in an operation selected from the group consisting of reading user data and writing user data after performing the clearance control in the first mode. Thus, in accordance with embodiments of the present invention, the method allows appropriate clearance control according to a change in fly height due to deposits after a load operation.

Embodiments of the present invention provide clearance control according to a change in fly height, alternatively referred to herein as a fly-height change, of a slider after a load operation. Embodiments of the present invention are described, herein, by way of example, without limitation thereto, of a HDD, which is an example of a disk drive. In accordance with embodiments of the present invention, a HDD adjusts the clearance between a read element, or alternatively, the write element, of the magnetic-recording head and a magnetic-recording disk with a heater element, which is an example of a clearance adjustment portion. As described herein, in accordance with embodiments of the present invention, clearance control which controls the protrusion of the read element, or alternatively, the write element, of the magnetic-recording head by heat from the heater element on the head-slider is referred to by the term of art, "thermal fly-height control," or "TFC." In accordance with embodiments of the present invention, the thermal expansion of the read element, or alternatively, the write element, of the magnetic-recording head varies with the heat from the heater element of the head-slider. Accordingly, TFC is capable of adjusting the clearance. Before describing the clearance control of embodiments of the present invention, the configuration of a HDD is next described.

Figure 1:
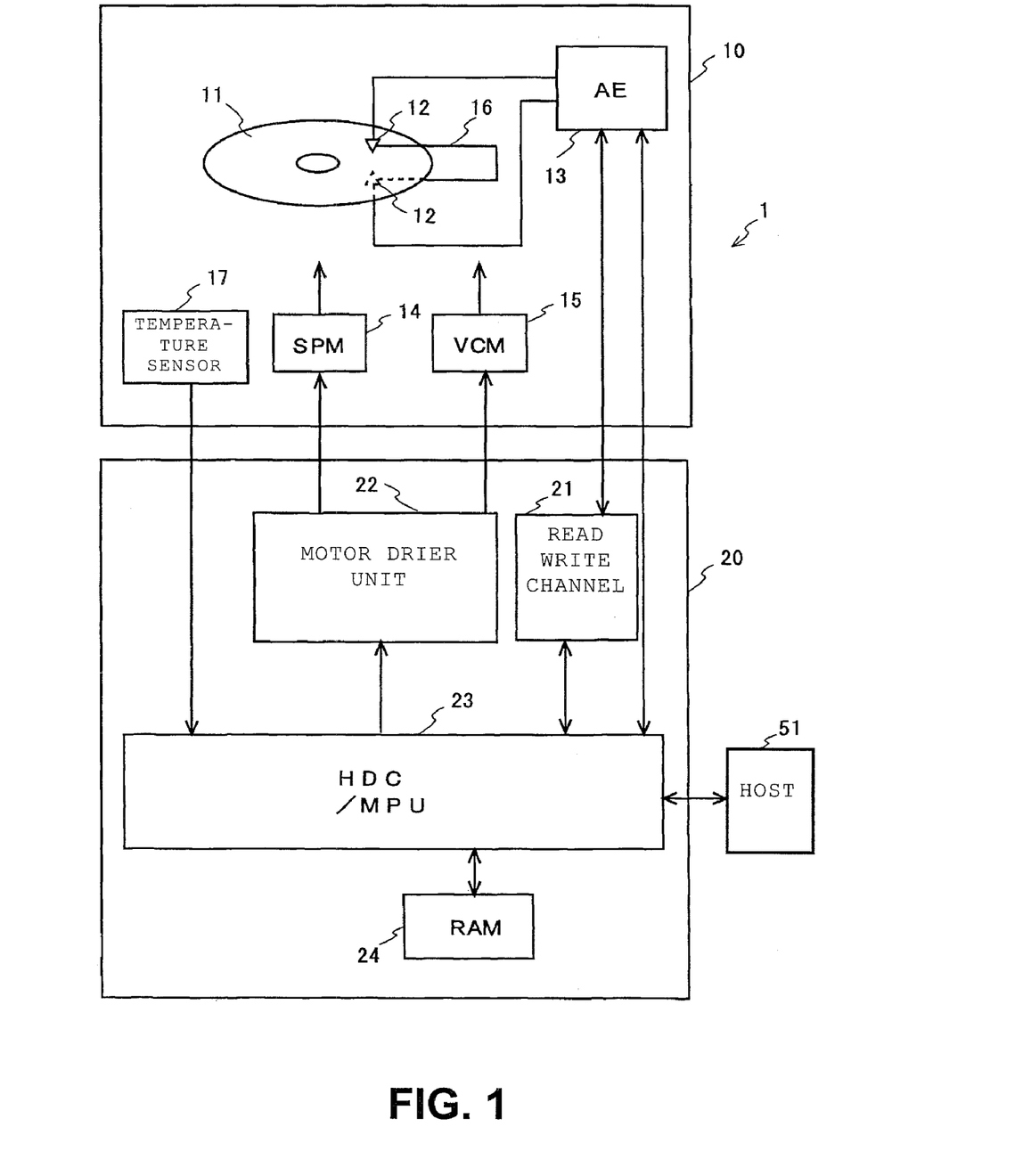
FIG. 1 is a block diagram schematically illustrating a configuration of a HDD, in accordance with an embodiment of the present invention.

With reference now to FIG. 1, in accordance with embodiments of the present invention, a block diagram is shown that illustrates a configuration of a HDD. A HDD 1 includes a magnetic-recording disk 11, which serves as a disk to store data, in a disk enclosure (DE) 10. A spindle motor (SPM) 104 spins the magnetic-recording disk 11 at a specific angular rate. Head-sliders 12 are provided which access the corresponding recording surfaces of the magnetic-recording disk 11. As used herein, "access" is a term of art that refers to operations in seeking a data track of a magnetic-recording disk and positioning a magnetic-recording head on the data track for both reading data from, and writing data to, a magnetic-recording disk. Each of the head-sliders 12 includes a slider for flying in proximity to the recording surface of the magnetic-recording disk and a magnetic-recording head secured on the slider for carrying out the conversion between magnetic signals and electrical signals.

In accordance with embodiments of the present invention, each of the head-sliders 12 includes a heater element for causing the magnetic-recording head to expand and protrude by heat to adjust the clearance, which is the spacing, between the magnetic-recording disk 11 and the magnetic-recording head. The structure of the head-slider 12 is subsequently described in detail with reference to FIG. 2. The head-sliders 12 are secured at the distal end of an actuator 16. The actuator 16 is attached to a voice coil motor (VCM) 15 and rotates on the pivot shaft to move the head-sliders 12 in proximity with the recording surface of the spinning magnetic-recording disk 11 along nominally the radial direction of the magnetic-recording disk 11. A moving mechanism of the head-sliders 12 includes the actuator 16 and the VCM 15.

On a circuit board 20 affixed on the outside of the DE 10, circuit elements are mounted. A motor driver unit 22 drives the SPM 14 and the VCM 15 according to control data from a hard-disk controller/microprocessor unit (HDC/MPU) 23, which is a controller as described herein. A random access memory (RAM) 24 functions as a buffer to temporally store read data and write data. An arm-electronics (AE) module 13 in the DE 10 selects a head-slider 12 to access, which occurs upon reading data from, or writing data to, the magnetic-recording disk 11 from a plurality of head-sliders 12 and amplifies read-back signals to transmit the read-back signals to a read write channel (RW channel) 21. AE module 13 also transmits write signals from RW channel 21 to a selected head-slider 12. AE module 13 functions as an adjustment circuit for supplying power to a heater of a selected head-slider 12 and for adjusting the power.

RW channel 21, in a read operation, amplifies read-back signals supplied from AE module 13 to have specific amplitudes, extracts data from the obtained read-back signals, and decodes the data. The read data includes user data and servo data. The decoded read user data and servo data are supplied to HDC/MPU 23. RW channel 21, in a write operation, code-modulates write data supplied from HDC/MPU 23, converts the code-modulated data into write signals, and then supplies the write signals to AE module 13.

HDC/MPU 23, an example of a controller, performs control of the HDD 1 in addition to processes concerning data processing, such as: reading and writing operation control; command execution order management; positioning control of the head-sliders 12 using servo signals, which is referred to by the term of art, "servo control;" interface control to and from a host 51; defect management; and, error handling when any error occurs. HDC/MPU 23 performs TFC according to the detected temperature of a temperature sensor 17. In an embodiment of the present invention, HDC/MPU 23 performs TFC according to the clearance change after a load operation.

Figure 2:
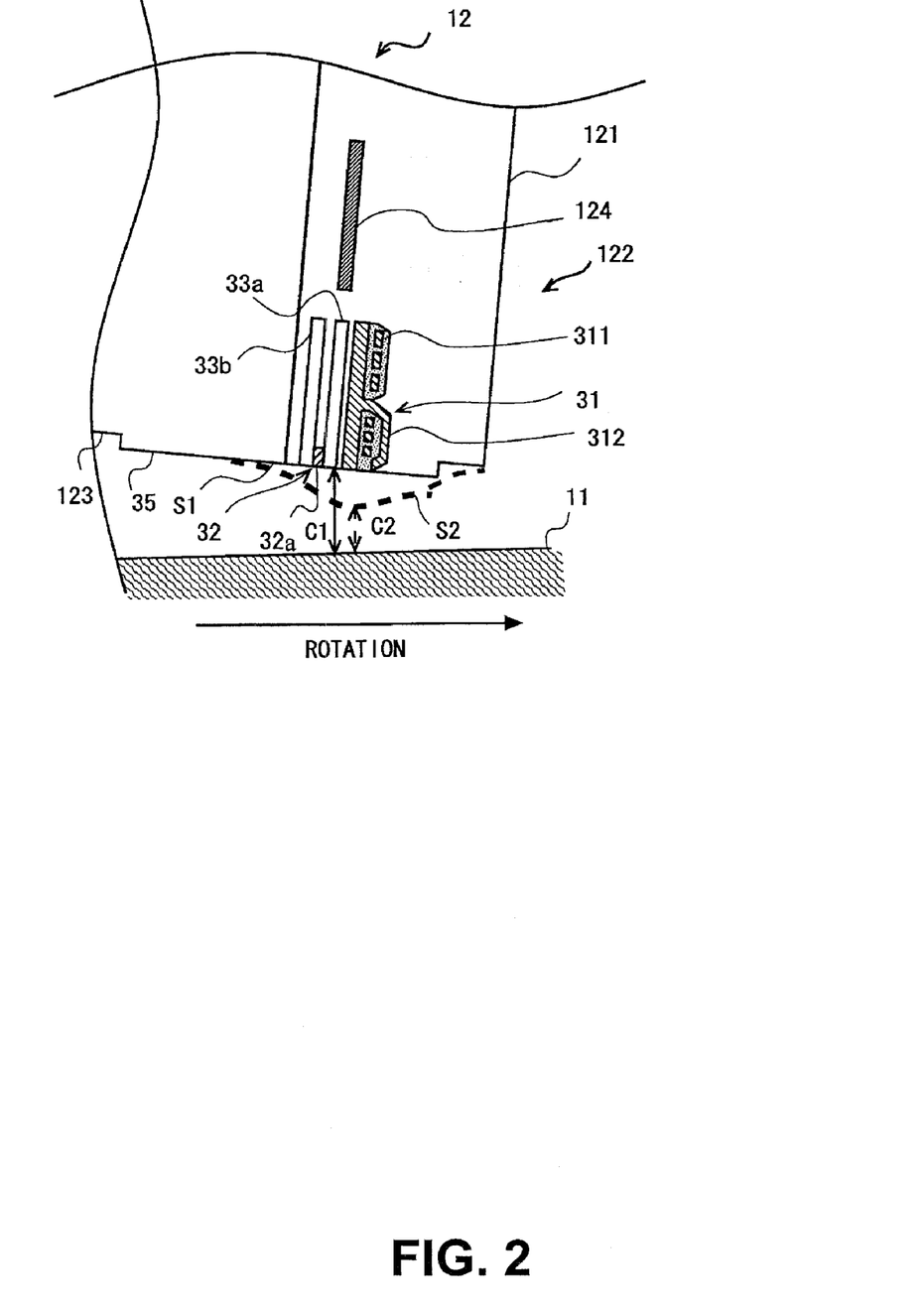
FIG. 2 is a cross-sectional view schematically illustrating a structure of a head-slider including a heater for TFC, in accordance with an embodiment of the present invention.

With reference now to FIG. 2, in accordance with embodiments of the present invention, a cross-sectional view is shown that schematically illustrates a configuration in the vicinity of a trailing-edge surface 121 of a head-slider 12 in a structure of the head-slider 12 that includes a heater 124 for TFC. A slider 123 supports a magnetic-recording head 122. The magnetic-recording head 122 includes a read element 32 and a write element 31. The write element 31 generates a magnetic field between magnetic poles 312 by means of electrical current flowing across a write coil 311 to write magnetic data onto the magnetic-recording disk 11. The read element 32 includes a magnetoresistive element 32a having magnetic anisotropy that is disposed between magnetic shields 33a and 33b and reads magnetic data by means of the resistance varying with the magnetic field from the magnetic-recording disk 11. A heater 124 is placed in the vicinity of the write element 31 and the read element 32. The heater 124 may be, for example, a wound thin-film resistive element.

When AE module 13 supplies the heater 124 with electrical current, which is associated with electrical power supplied to the heater 124, the magnetic-recording head 122 is deformed to protrude by the heat of the heater 124. For example, in non-heating, the shape of the ABS 35 of the head-slider 12 is indicated by S1; and, the clearance, which is a distance between the magnetic-recording head 122 and the magnetic-recording disk, is indicated by C1. The protruding shape S2 upon heating the heater 124 is indicated by a dashed line. The magnetic-recording head 122 approaches the magnetic-recording disk 11 and the clearance C2 is smaller than the clearance C1. The protruding amount of the magnetic-recording head 122 and the clearance vary with the heater power value supplied to the heater 124. FIG. 2 is by way of illustration and the dimensions of the figure are not rigidly defined.

HDC/MPU 23 performs TFC depending on the temperature in the drive. HDD 1 includes a temperatures sensor; and, HDC/MPU 23 determines the heater power according to the temperature from the detected temperature and a preset function, P(t). Typically, different functions P(t) are prepared for operations such as the read operation and the write operation. The functions of heater power depending on the temperature are stored in the magnetic-recording disk 11, or alternatively, other non-volatile memory. HDC/MPU 23 determines the heater power with reference to the function P(t). In an embodiment of the present invention, the corresponding function P(t) is stored for each of the head-sliders 12. The function changes depending on the radial position of the head-slider 12. For example, HDC/MPU 23 determines the heater power according to the temperature with different functions for zones.

HDD 1 includes a ramp (not shown) for providing a retract position from proximity to the recording surface of the magnetic-recording disk 11 for the actuator 16 and the head-slider 12. For power saving when the magnetic-recording disk 11 is not accessed from the host 51 and while the power is off, HDD 1 moves the actuator 16 and the head-slider 12 to the ramp from proximity to the recording surface of the magnetic-recording disk, which occurs upon an unload operation, and the actuator 16 stays on the ramp at the stop position, which is a waiting position.

When the magnetic-recording disk 11 is accessed, HDC/MPU 23 moves the actuator 16 and the head-slider 12 from the ramp into proximity with the recording surface of the magnetic-recording disk 11, which occurs upon a load operation. Subsequently, HDC/MPU 23 performs the positional control of the actuator 16, to which the head-slider 12 is attached, with servo signals read by the head-slider 12.

In one embodiment of the present invention, HDC/MPU 23 moves the actuator 16 and the head-slider 12 from the ramp into proximity with the recording surface of the magnetic-recording disk 11, which occurs upon a load operation, and then, controls the heater power according to fly-height change of the head-slider 12. The slider fly height starts to reduce immediately after a load operation, and then, converges to a specific value. The fly-height change depends on changes in the amount and position of deposits, which is a factor in the state of deposit, on the slider body 123 of the head-slider 12.

The heater power function P(t) depending on temperature determines the heater power for the fly height of the head-slider 12, which remains a constant value after convergence has occurred. HDC/MPU 23 controls the heater power to compensate for the difference between the clearance when the fly height is constant and the clearance after a load operation. For example, HDC/MPU 23 calculates a correction value ΔP of the heater power from the difference, and adds the correction value ΔP to the value determined by the function P(t). If the fly height, which is the clearance, has converged to the specific value, HDC/MPU 23 immediately shifts a load operation from the clearance mode to the normal clearance control mode.

In accordance with embodiments of the present invention, examples of clearance control immediately after a load operation are next described. In one embodiment of the present invention, the clearance, which is associated with the clearance change, in a load operation is measured through operations at short intervals; and, the heater power is controlled depending on the measurement results. HDD 1 performs a plurality of clearance measurement processes until the clearance converges to a specific value after a load operation in order to effectively compensate for the clearance change after the load operation. HDD 1 supplies power to the heater 124 according to the clearance measurement values to maintain the designated clearance value. If the clearance has become substantially constant regardless of the elapsed time, HDD 1 switches to the normal clearance control mode.

Figure 3:
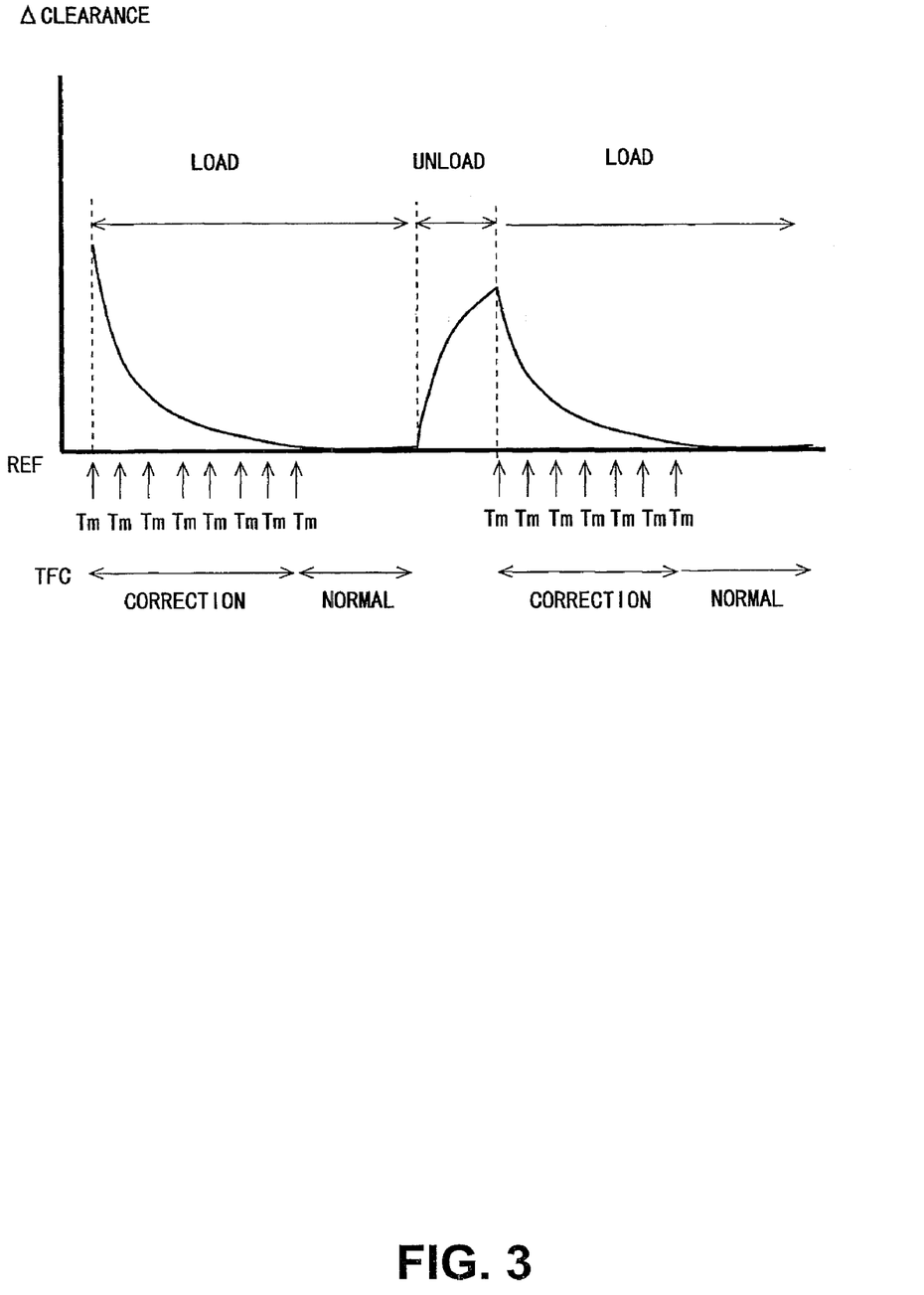
FIG. 3 is a graph illustrating a clearance change after a load operation and timing of a clearance measurement Tm, in accordance with an embodiment of the present invention.

With reference now to FIG. 3, in accordance with embodiments of the present invention, a graph is shown that illustrates a clearance change after a load operation, and timing of a clearance measurement Tm. In FIG. 3, the Y axis represents the difference, which is Δ clearance, between a reference value (REF) and clearance measurement values. The axis represents the elapsed time from a load operation. HDD 1 measures the clearance at each time point Tm and corrects the heater power according to the difference of the measurement result from the reference value.

As the reference value, the clearance value in the normal mode TFC in response to the detected temperature, or alternatively, the clearance value when the clearance control with the heater is not performed may be used. When the clearance control is not performed, the heater 124 is supplied with the power of the initial value; and, the typical supplied power is 0 watts (W). The heater power in the clearance measurement a load operation is the heater power of the clearance reference value.

Figure 4:
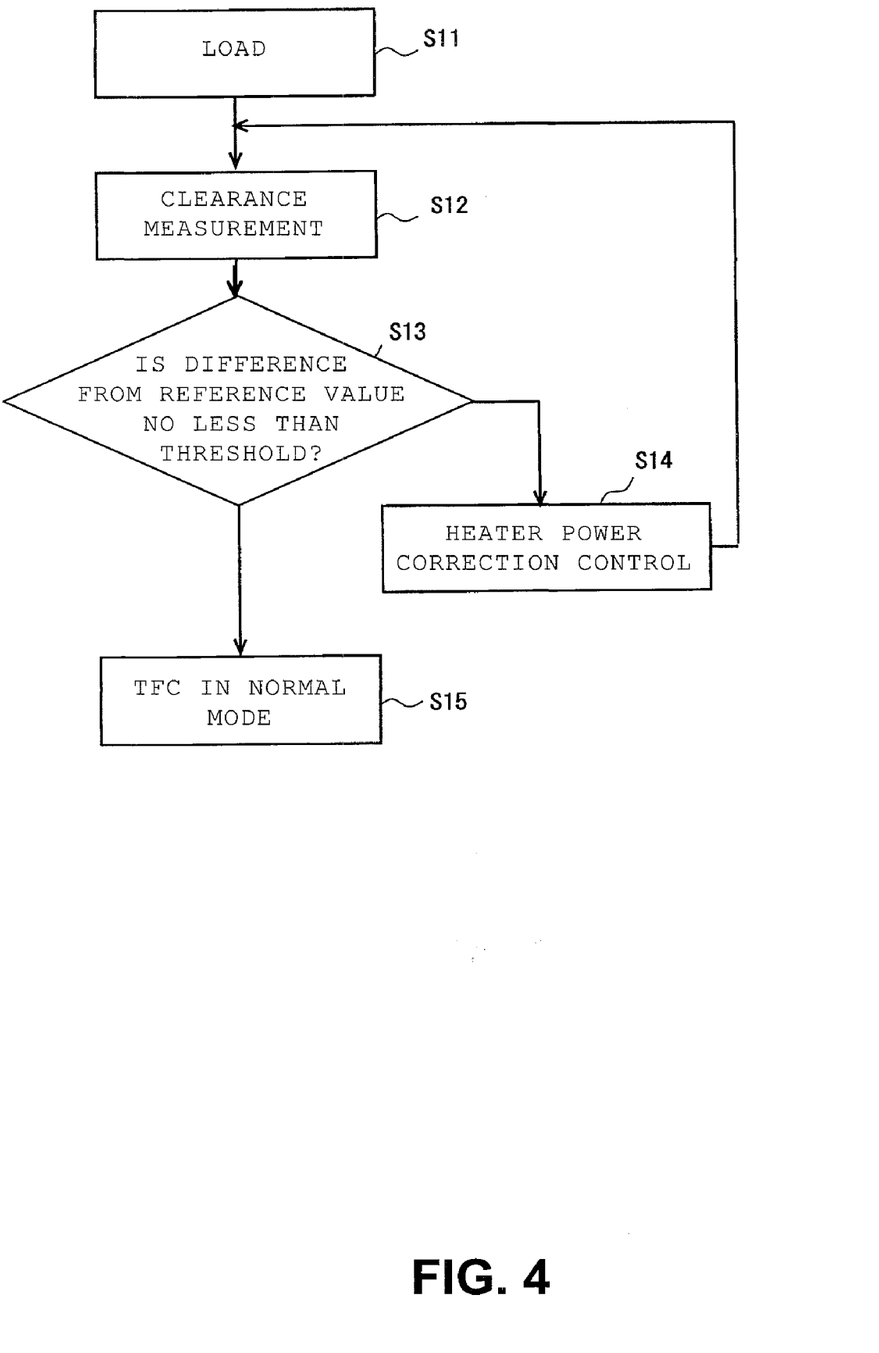
FIG. 4 is a flowchart showing a process flow of clearance control immediately after a load operation, in accordance with an embodiment of the present invention.

With reference now to FIG. 4, in accordance with embodiments of the present invention, a flowchart is shown that shows a process flow of clearance control immediately after a load operation, which is next described. HDC/MPU 23 controls the VCM 15 through the motor driver unit 22 to move the actuator 16 and the head-slider 12 from the stop position in proximity to the recording surface of the magnetic-recording disk 11, which occurs upon a load operation, at S11. HDC/MPU 23 moves the head-slider 12 to a specific track and reads out data for clearance measurement on the track with the head-slider 12. At S12, HDC/MPU 23 calculates the on-going clearance from the read-back signals. The calculated clearance may be, by way of example without limitation thereto, the absolute value of the distance; but also, other values may be used that allow calculation of the difference from the reference value.

HDC/MPU 23 compares the reference value corresponding to the convergence value of clearance and the clearance measurement value. If the difference between the reference value and a measured value exceeds a threshold level (Y-branch after S13 going to S14), HDC/MPU 23 controls the heater power to reduce the difference between the reference value and the measured value in the mode in association with the clearance change a load operation, at S14. After a preset specific time has elapsed, at S12, HDC/MPU 23 performs the clearance measurement, and the comparison between the measured value and the reference value again.

If a clearance measurement value approaches the reference value and, at S13, the difference is less than the threshold level, HDC/MPU 23 performs the normal mode TFC, at S15. TFC different from normal mode performed when the difference is larger than the threshold level allows maintaining both the performance and reliability. Depending on design, HDC/MPU 23 may shift to the normal mode after the specified time has elapsed. This is the same as the other embodiments.

HDC/MPU 23 carries out accesses on the magnetic-recording disk 11 between the clearance measurement processes, at S12. The heater power in the accesses is a value in the TFC mode immediately after the load operation. Typically, HDC/MPU 23 calculates the heater power correction value $\Delta P$ from the clearance measurement value and the reference value, and supplies the heater 124 with power obtained by adding the correction value $\Delta P$ to the heater power P(t) in the normal mode.

Figure 5:
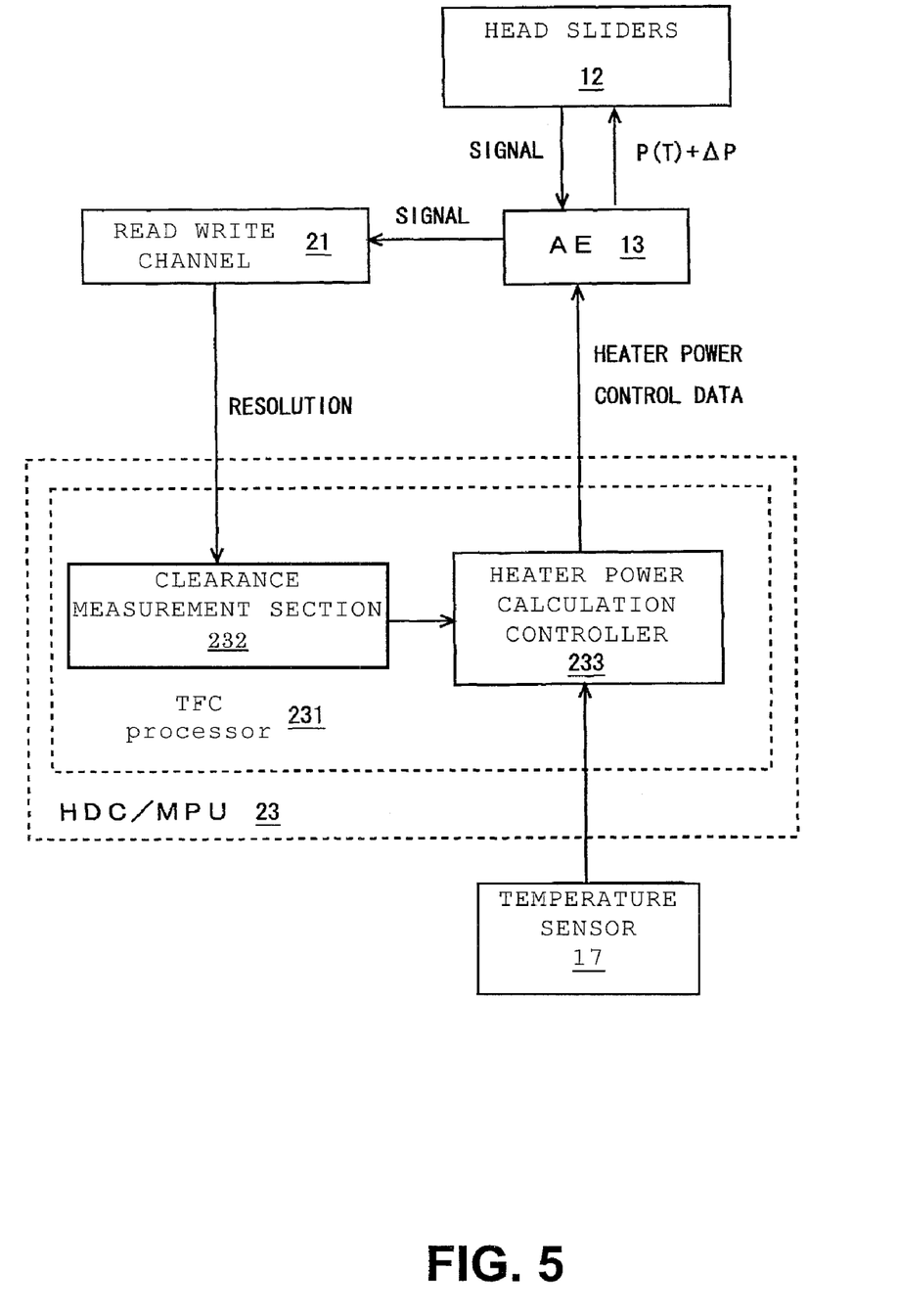
FIG. 5 is a block diagram schematically illustrating an example of a logical configuration for performing a clearance measurement after a load operation and TFC based on a measurement result of the clearance measurement, in accordance with an embodiment of the present invention.

With reference now to FIG. 5, in accordance with embodiments of the present invention, a block diagram is shown that schematically illustrates an example of a logical configuration for performing a clearance measurement after a load operation and TFC based on a measurement result of the clearance measurement. In the configuration in FIG. 5, a TFC processor 231 performs TFC including clearance measurement. TFC processor 231 is a functional block; and, TFC processor 231 is implemented by operations of the hardware and the MPU in accordance with the software in HDC/MPU 23.

In accordance with embodiments of the present invention, the TFC processor 231 measures the clearance from the resolution of read-back signals of the head-slider 12. There exist some values calculated from the read-back signal amplitude for determining, in other words, measuring, the clearance change. Among various methods for the measurement of clearance change, the measurement of clearance change from the resolution is one of the most accurate methods. For example, the resolution may be represented by the ratio between lower frequency components and higher frequency components in a read-back signal.

The clearance can be represented by a linear function of resolution which is obtained by a proper linear transformation of the resolution. If the clearance decreases, higher components of a read-back signal increase and the resolution becomes higher. Typically, the linear functions relating the resolution to the clearance are different for each of the head-sliders 12. The functional relationship between the resolution and the clearance for each head-slider 12 is preset in HDD 1.

TFC processor 231 analyzes a read-back signal and calculates the ratio between the higher components and the lower components to calculate the resolution. Alternatively, HDC/MPU 23 may obtain the resolution, given by a corresponding value, from RW channel 21. RW channel 21 includes a function to adjust waveforms of read-back signals. RW channel 21 performs the waveform shaping with a digital filter. For the digital filter, a digital filter is known in the art which corrects the frequency components of read-back signals. The correction value has a linear functional relationship with the clearance, which is associated with the resolution, and a value representing the resolution.

The clearance measurement section 232 obtains a resolution value from RW channel 21 and calculates the clearance from the value. The clearance may be represented by any unit, such as heater power, nanometer and units similarly related to the clearance. HDC/MPU 23 may use the resolution obtained from RW channel 21 as a value representing the clearance.

A heater power calculation controller 233 compares a clearance measurement value from a clearance measurement section 232 and a clearance reference value. The heater power calculation controller 233 calculates the reference value from a preset function and the detected temperature of the temperature sensor 17, which is associated with the temperature in HDD 1.

If the difference between the measured value and the reference value is larger than a threshold level, the heater power calculation controller 233 corrects the heater power according to the difference and performs a read, or alternatively, a write, operation. The heater power calculation controller 233 sets control data indicating a heater power value to AE module 13. AE module 13 supplies the heater 124 with the power depending on the control data. If the difference of the measured value from the reference value is smaller than the threshold level, the heater power calculation controller 233 uses a heater power value determined by the function used in the normal mode without correcting the heater power value. The TFC processor 231 performs the TFC according to the detected temperature by the temperature sensor 17 and the preset function without subsequent clearance measurement.

HDC/MPU 23 performs the clearance measurement at specified intervals. The intervals of the measurement may be constant or varied. Specifically, HDC/MPU 23 may increase the interval with the elapsed time from a load operation. The slider fly height greatly changes immediately after a load operation, and then, the rate of change, for example, given in incremental units of nanometers per second ($\Delta$nm/s), gradually decreases. Thus, HDC/MPU 23 performs the clearance measurement at frequent intervals in an early period and then decreases the measurement frequency. Thus, in accordance with embodiments of the present invention, HDC/MPU 23 allows both precise clearance control and high performance.

In order to ascertain accurately the clearance change due to the deposit state change on the head-slider 12, as described above, the clearance is measured repeatedly, in one embodiment of the present invention. However, the clearance measurement takes some time and the repeated measurement may possibly decrease the performance of the HDD. Therefore, in another embodiment of the present invention, a clearance change profile is preset in a load operation of HDD 1; and, TFC is performed in accordance with the profile until the clearance converges.

Figure 6:
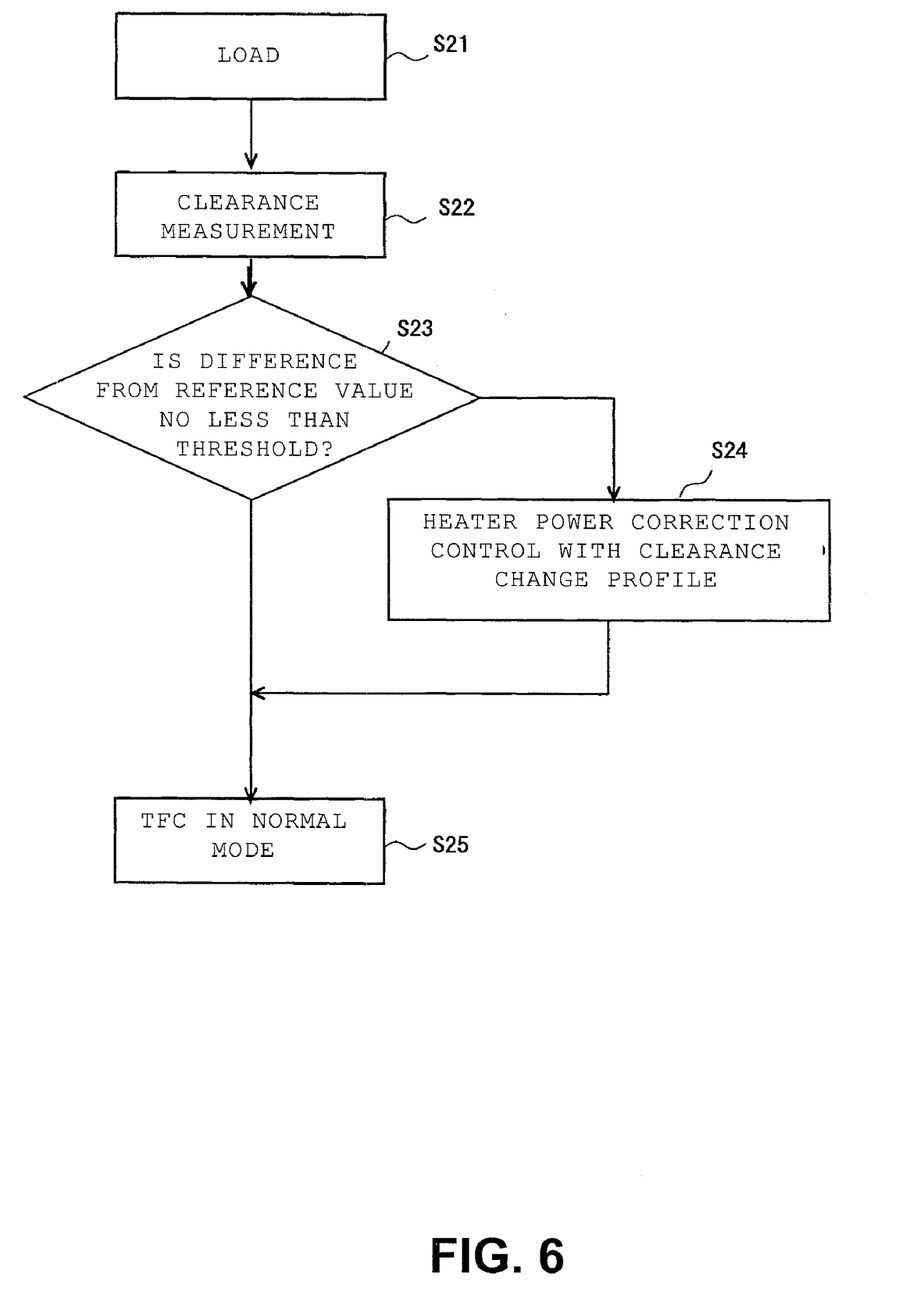
FIG. 6 is a flowchart showing a TFC process in accordance with clearance change profile, set data, in accordance with an embodiment of the present invention.

With reference now to FIG. 6, in accordance with embodiments of the present invention, a flowchart is shown that shows a TFC process in accordance with clearance change profile, preset data, which is next described. HDC/MPU 23 controls the VCM 15 through the motor driver unit 22 to move the actuator 16 and the head-slider 12 from the ramp into proximity with the recording surface of the magnetic-recording disk 11, which occurs upon a load operation, at S21. HDC/MPU 23 moves the head-slider 12 to a specific track and reads data for clearance measurement recorded on the track with the head-slider 12. Furthermore, at S22, HDC/MPU 23 determines the on-going clearance from the read-back signal. The determined clearance may be, by way of example without limitation thereto, the absolute value of the distance; but also, other values may be used that allow calculation of the difference from the reference value.

HDC/MPU 23 compares the reference value corresponding to the convergence value of clearance and the clearance measurement value. If the difference between the reference value and the measured value (Y-branch after S23 going to S24), HDC/MPU 23 performs TFC in accordance with the clearance change profile, at S24. Afterward, at S25, HDC/MPU 23 shifts to the normal clearance control mode. If the clearance measurement value approaches the reference value and the difference is smaller than a threshold level (N-branch after S23 going to S25), HDC/MPU 23 starts the normal mode TFC without carrying out TFC in accordance with the clearance change profile, at S25.

Figure 7:
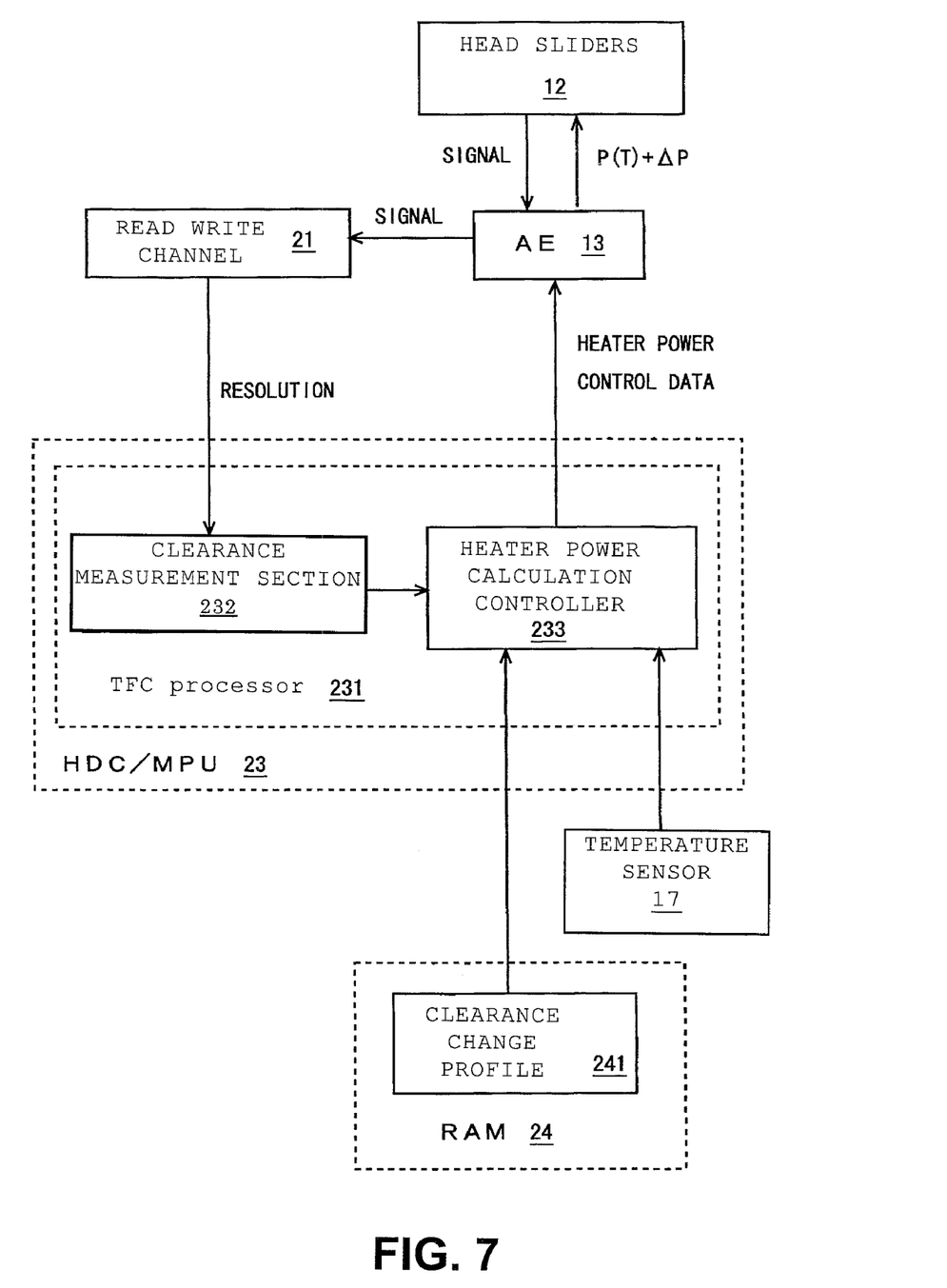
FIG. 7 is a block diagram schematically illustrating a configuration associated with a clearance correction process using the clearance change profile, in accordance with an embodiment of the present invention.

With reference now to FIG. 7, in accordance with embodiments of the present invention, a block diagram is shown that schematically illustrates a configuration associated with a clearance correction process using the clearance change profile. HDD 1 stores data, which is associated with the clearance change profile, in the form of a functional relationship, or alternatively, a table, indicating the clearance change which was set in a test operation in manufacturing. The clearance profile is loaded to the RAM 24 upon start up of HDD 1. The clearance measurement section 232, a function of HDC/MPU 23, obtains the clearance change profile 241 from the RAM 24 and determines the heater power in accordance with the profile.

The clearance change profile may be represented by a function, or alternatively, by a table. A proper profile is set according to the measured data in the designing of the HDD. Otherwise, clearance change profiles may be set for individual HDDs according to measure data in test operations in manufacturing of the HDDs.

With further reference to FIG. 3, in accordance with embodiments of the present invention, the clearance drastically reduces immediately after a load operation and then continues to decrease while the reduction ratio gradually decreases. The clearance, which has converged, maintains a substantially constant value, which is a clearance reference value. The clearance change profile 241 is data indicating such clearance change with the elapsed time after a load operation. For example, the clearance change profile 241 is represented by an exponential function. Specifically, the clearance change, or alternatively, the correction amount corresponding to the clearance change, $\Delta CL$, may be represented by the following function:

$$\Delta CL = LC0 \times \exp(-Tn/d)$$

where $Tn$ is the elapsed time; $LC0$ is the difference from the convergence value at the $Tn=0$; and $d$ is a reference time constant. Another example function to represent the clearance change profile 241 is a step function.

Generally, the clearance change after a load operation depends on the temperature in drive. Thus, in an embodiment of the present invention, HDD 1 includes the clearance change profile 241, which changes with temperature. For example, HDD 1 includes a functional relationship utilized by HDD 1 to control heater power, for example, an exponential function, for each of divided temperature ranges included in the guaranteed operating temperature range. The heater power calculation controller 233 chooses the function corresponding to the detected temperature of the temperature sensor 17.

In another embodiment of the present invention, the clearance change profile 241 is represented by a function depending on temperature. The heater power calculation controller 233 substitutes the detected temperature by the temperature sensor 17 into the clearance change profile 241 to obtain the clearance change profile 241 at the temperature. The clearance change profile 241 is a function of the clearance with respect to time and the final constant value of the function is the reference value of clearance at the temperature.

Otherwise, HDD 1 may have a clearance change profile, for example, which is a functional relationship relating the clearance to temperature, for each of divided temperature ranges included in the operation guarantee temperature range. The heater power calculation controller 233 chooses the function corresponding to the temperature detected by the temperature sensor 17, and corrects the function in such a manner that the convergence value of the function agrees with the clearance reference value at the detected temperature.

The correction, for example, shifts the function along the Y axis to make the convergence value agree with the reference value. Otherwise, the functional relationship corresponding to each of the temperature ranges may have a variable parameter of temperature; and, the heater power calculation controller 233 may substitute the detected temperature obtained from the temperature sensor 17 into the variable parameter to calculate the clearance change profile function corresponding to the drive temperature, which is the detected temperature of the HDD.

Figure 8:
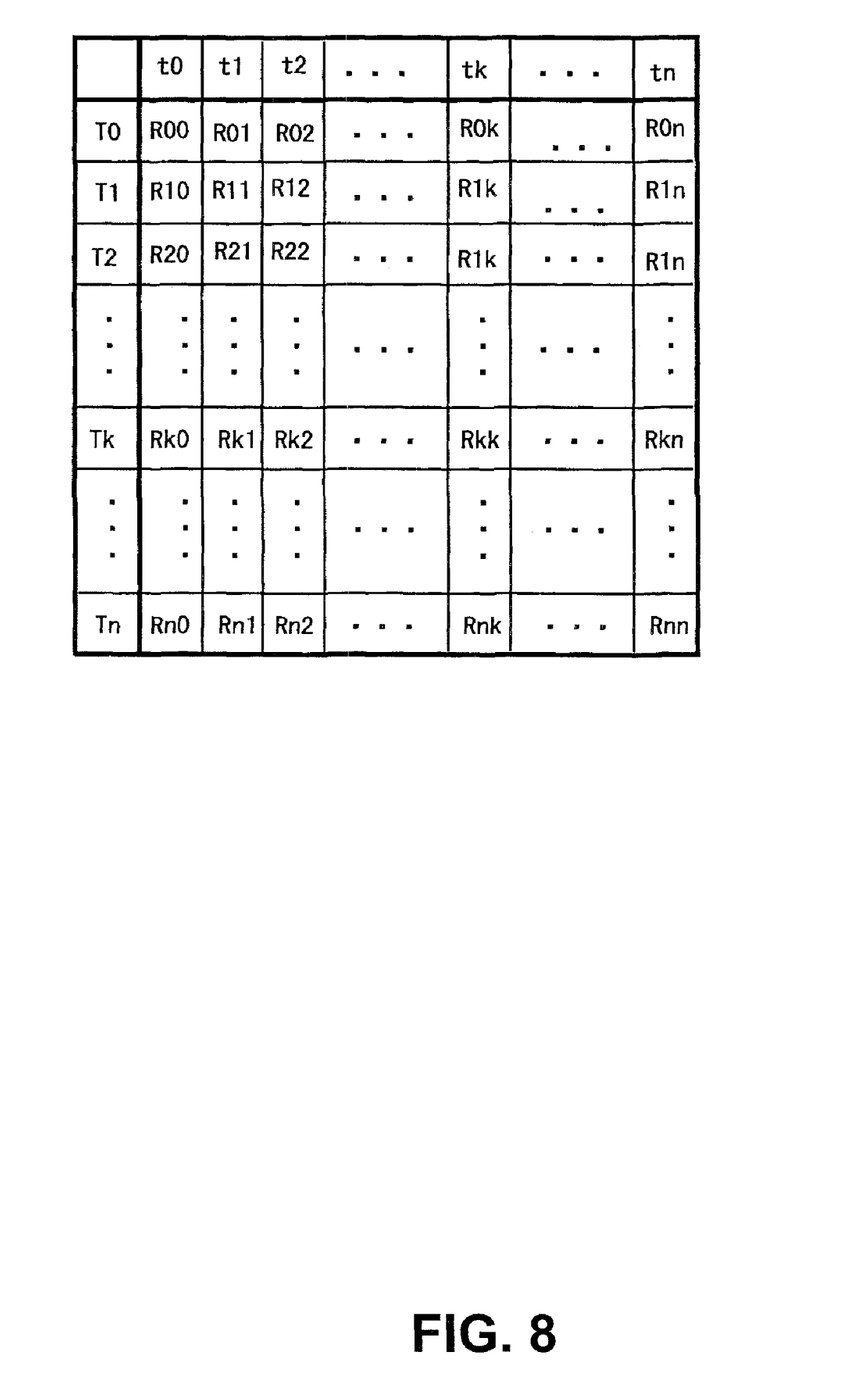
FIG. 8 is an example matrix table of a clearance change profile in the form of a matrix table of temperature and time, in accordance with an embodiment of the present invention.

With reference now to FIG. 8, in accordance with embodiments of the present invention, an example matrix table is shown of a clearance change profile in the form of a matrix table of temperature and time, which HDD 1 may include. In FIG. 8, $Tx$ is the temperature; $tx$ is the elapsed time; and, $Rxx$ is the clearance change, which corresponds to the correction amount, from the convergence value. The heater power calculation controller 233 determines the correction amount $Rxx$ in the matrix table from the detected temperature by the temperature sensor 17 and the elapsed time from a load operation.

The clearance change after a load operation depends on the clearance initial value immediately after the load operation. The clearance measurement section 232, like the configuration in FIG. 5, calculates the clearance measurement value from the resolution obtained from RW channel 21, and provides the heater power calculation controller 233 with the value. The heater power calculation controller 233 uses the obtained value as the initial value of the clearance change profile 241; and, the heater power calculation controller 233 can calculate the subsequent clearance change with elapsed time. The heater power calculation controller 233 calculates the heater power correction value ΔP to compensate for a portion of, or all of, the difference between the calculated clearance value and the reference value, which is the convergence value.

HDC/MPU 23 performs operations such as a read operation and write operations at the heater power P+ΔP determined by the heater power calculation controller 233. The heater power calculation controller 233 measures the elapsed time using an internal clock signal and calculates the heater power correction value ΔP according to the elapsed time.

In another embodiment of the present invention, the heater power calculation controller 233 uses both clearance measurement and the clearance change profile 241 to cope with the clearance change after a load operation. The clearance change profile 241 is preset data and does not always agree with the actual clearance change.

In another embodiment of the present invention, the heater power calculation controller 233 uses correction values obtained by the clearance measurement in a range where the clearance exhibits rapid change for more precise clearance control. Furthermore, the controller 233 uses the clearance change profile 241 in a range where the clearance change is small to avoid a reduction in performance. For example, the heater power calculation controller 233 may choose between the measurement and the profile depending on the elapsed time from a load operation, which is next described.

Figure 9:
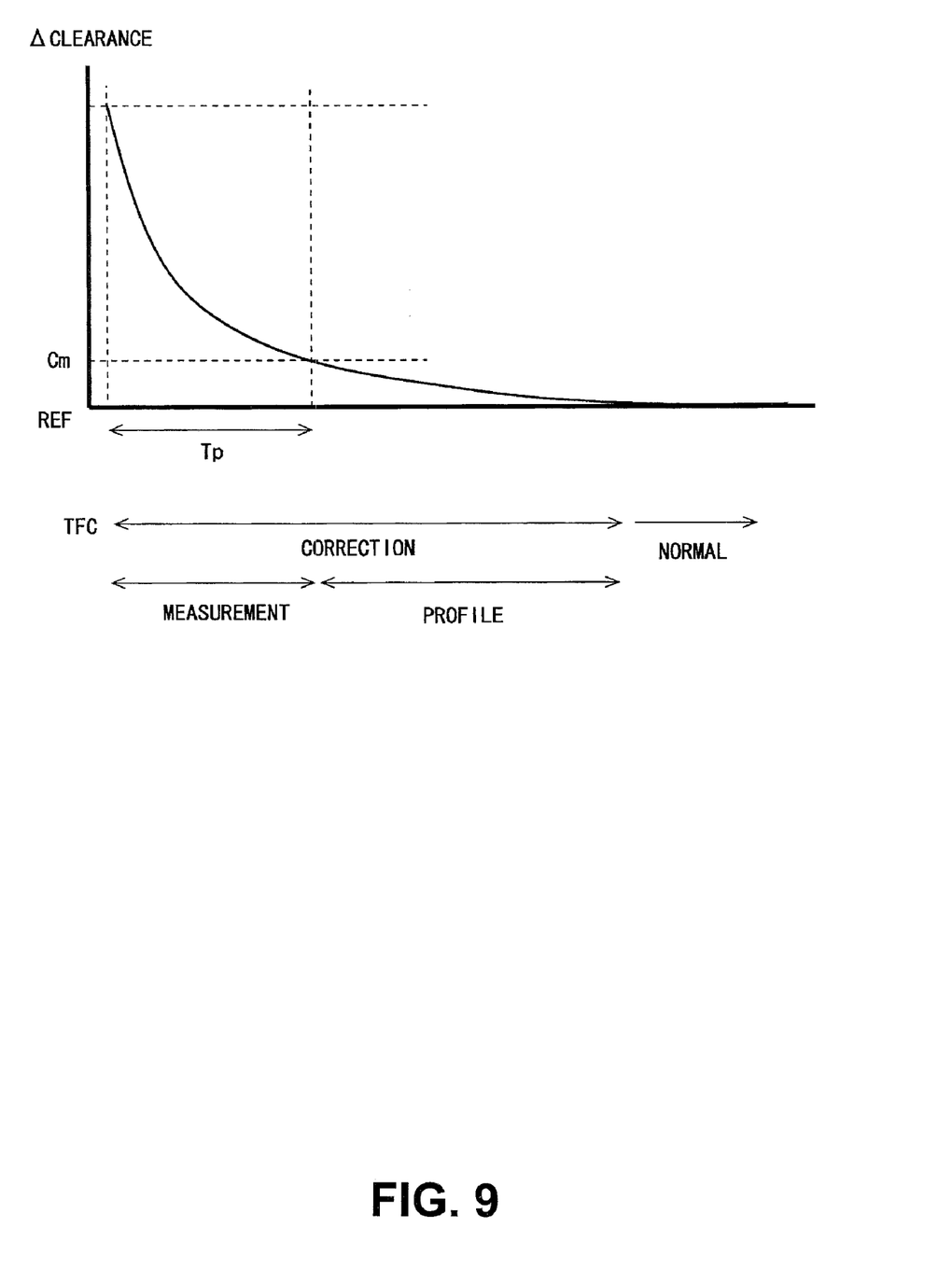
FIG. 9 is a graph illustrating an example clearance change which uses a clearance measurement and a profile in TFC immediately after a load operation, in accordance with an embodiment of the present invention.

With reference now to FIG. 9, in accordance with embodiments of the present invention, a graph is shown that illustrates an example clearance change which uses a clearance measurement and a profile in TFC immediately after a load operation. As shown in FIG. 9, the heater power calculation controller 233 repeats the clearance measurement to calculate the heater power correction value until a specified time Tp has passed. After the specified time Tp, the heater power calculation controller 233 calculates the heater power correction value in accordance with the preset clearance change profile. The specified time Tp may change depending on the initial clearance measurement value.

The heater power calculation controller 233 may choose between the measurement and the profile depending on a clearance measurement value. For example, the heater power calculation controller 233 repeats the clearance measurement to calculate the heater power correction value until the clearance measurement value reaches a specified value Cm and subsequently uses the clearance change profile.

Otherwise, HDC/MPU 23 may interpolate clearance changes between consecutive clearance measurement processes by use of the profile. For example, the heater power calculation controller 233 performs the clearance measurement processes at regular intervals and calculates the heater power correction value as a function value of time from the on-going clearance measurement value and the clearance change profile until the next clearance measurement process. Thus, in accordance with embodiments of the present invention, the heater power calculation controller 233 allows reduction in the number of clearance measurement processes to cope with the clearance change between the measurement processes.

In the above description, the clearance measurement section 232 performs clearance measurement immediately after a load operation and the heater power calculation controller 233 determines the subsequent clearance changes using the measurement value as the initial value. In the interest of performance, however, in an embodiment of the present invention, TFC after a load operation may be performed with only the clearance change profile without measuring the clearance.

A reduction in the clearance after a load operation is because of the change in the state of deposits on the slider body 123. The initial clearance immediately after a load operation depends on the amount of deposits on the ABS. Deposits on side surfaces move to the ABS while the head-slider is stationed above the ramp after unloading. Thus, the initial clearance value changes depending on the duration of the time the head-slider 12 stays above the ramp.

Thus, in one embodiment of the present invention, the heater power calculation controller 233 measures the duration from an unload operation to a load operation, and estimates the initial clearance value of the load operation according to the measured elapsed time. Data such as a function and a table to estimate the initial clearance value is preset in HDD 1. For example, a test operation in manufacturing of HDD 1 determines the functional relationship between the waiting time and the initial clearance value, and stores the data indicating the functional relationship to the magnetic-recording disk 11. In another example, during design of an HDD, tests may be performed on a plurality of HDDs; and, the same data are stored in HDDs of the same design.

In an embodiment of the present invention, the heater power calculation controller 233 estimates the initial clearance value with reference to the waiting time of the head-slider 12 and then calculates the heater power in accordance with the clearance change profile. Thus, in an embodiment of the present invention, the heater power calculation controller 233 may eliminate the clearance measurement operation, and avoid a reduction in performance.

As set forth above, embodiments of the present invention have been described by way of examples; but, embodiments of the present invention are not limited to the above-described examples, which can, of course, be modified in various ways within the spirit and scope of embodiments of the present invention. For example, embodiments of the present invention may be applied to HDDs with a clearance adjustment portion other than the TFC, such as piezoelectric element. Moreover, embodiments of the present invention may be applied to disk drives other than HDDs. For example, embodiments of the present invention may also be applied to HDDs with head-sliders for reading user data, or alternatively, writing user data. In other embodiments of the present invention, the heater power correction according to fly-height change after a load operation may be applied to only reading user data, or alternatively, only writing of user data. However, in accordance with embodiments of the present invention, the correction in write operations is effective, because an error in a write operation could lead to user data loss.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
a disk configured to store data;
a slider configured to fly in proximity to a recording surface of said disk;
a magnetic-recording head on said slider configured to access said disk;
a moving mechanism configured to support and to move said head-slider;
an adjustment portion configured to adjust clearance between said magnetic-recording head and said disk; and
a controller configured to control said adjustment portion to control said clearance, wherein said controller is configured to perform clearance control in a first mode in an operation selected from the group consisting of reading user data and writing user data according to a change in fly height of said slider after a load operation, said clearance control in said first mode based on a pre-defined clearance change profile performed without measuring a clearance between said magnetic-recording head and said disk, and said controller configured to perform subsequently clearance control in a second mode in an operation selected from the group consisting of reading user data and writing user data.

2. The disk drive of claim 1, wherein said controller is configured to perform said clearance control in said first mode with reference to a first profile indicating said change in fly height with an elapsed time after said load operation.

3. The disk drive of claim 2, wherein said controller is configured to perform a clearance measurement after said load operation, and to perform said clearance control in said first mode in accordance with a measurement result of said clearance measurement and said first profile.

4. The disk drive of claim 2, wherein said controller is configured to perform multiple clearance measurements after said load operation, and to perform said clearance control in said first mode in accordance with measurement results of said multiple clearance measurements and said first profile.

5. The disk drive of claim 2, wherein said controller is configured to refer to a different profile from said first profile depending on detected temperature.

6. The disk drive of claim 1, wherein said controller is configured to perform multiple clearance measurements after said load operation, and to perform said clearance control in said first mode in accordance with measurement results of said multiple clearance measurements.

7. The disk drive of claim 1, wherein said controller is configured to perform a clearance measurement after said load operation, is configured to perform an operation selected from the group consisting of skipping said first mode and ending said first mode, and is configured to perform the clearance control in said second mode in an operation selected from the group consisting of reading user data and writing user data if a measurement result of said clearance measurement is within a reference range.

8. A method for controlling clearance in a disk drive between a magnetic-recording head on a slider and a disk, said method comprising:
moving a head-slider from a waiting position into proximity with a recording surface of a disk in a load operation;
performing clearance control in a first mode in an operation selected from the group consisting of reading user data and writing user data according to a change in fly height of said slider after said load operation, said clearance control in said first mode based on a pre-defined clearance change profile performed without measuring a clearance between said magnetic-recording head and said disk; and
performing clearance control in a second mode in an operation selected from the group consisting of reading user data and writing user data after performing said clearance control in said first mode.

9. The method of claim 8, wherein said clearance control performed in said first mode is performed with reference to a first profile indicating said change in said fly height with an elapsed time after said load operation.

10. The method of claim 9, wherein a clearance measurement is performed after said load operation, and said clearance control performed in said first mode is performed in accordance with a measurement result of said clearance measurement and said first profile.

11. The method of claim 9, wherein multiple clearance measurements are performed after said load operation, and said clearance control is performed in said first mode in accordance with measurement results of said multiple clearance measurements and said first profile.

12. The method of claim 9, wherein a different profile from said first profile is referred to depending on detected temperature.

13. The method of claim 8, wherein multiple clearance measurements are performed after said load operation, and said clearance control performed in said first mode is performed in accordance with measurement results of said multiple clearance measurements.

14. The method of claim 8, wherein a clearance measurement is performed after said load operation, said first mode is skipped, and then said clearance control in said second mode is performed in an operation selected from the group consisting of reading user data and writing user data if a measurement result of said clearance measurement is within a reference range.

15. The method of claim 8, wherein a clearance measurement is performed after said load operation, said first mode is ended, and then said clearance control in said second mode is performed in an operation selected from the group consisting of reading user data and writing user data if a measurement result of said clearance measurement is within a reference range.

* * * * *